Patented Apr. 14, 1931

1,800,551

UNITED STATES PATENT OFFICE

GEORGE JAMES MANSON, OF HAWKESBURY, ONTARIO, CANADA, ASSIGNOR, BY MESNE ASSIGNMENTS, TO MANSON CHEMICAL COMPANY, OF MONTCLAIR, NEW JERSEY, A CORPORATION

PAPER

No Drawing.     Application filed July 8, 1926. Serial No. 121,262.

This invention relates to improvements in paper, and the objects of the invention are to make paper less susceptible to atmospheric moisture whereby its utility in the lithograph, printing and other trades may be increased.

It is usual to waterproof paper either by introducing a water repellant substance such as wax into the paper stock while in the beater or by applying a water repellant substance to the surface of the paper either before or after drying. Various forms of filler such as finely divided talc have also been introduced into the paper stock for a variety of purposes. I have found it possible, by introducing appropriate quantities of a wax emulsion and a filler into the paper stock, to produce a paper of increased utility for lithographing, printing and other trade purposes. The water repellant substance is conveniently in the form of a wax emulsion formed from animal, mineral or vegetable wax or any suitable combination of these. The filler may be finely divided talc or a colloidal clay such as bentonite.

The emulsion of the wax may be formed in any convenient way and may, for example, be made in the way described in my application filed under Serial No. 121,260, filed July 8th, 1926.

As set forth in this companion application, it is desirable in the formation of emulsions that the emulsifying medium, or the medium which is relied upon to facilitate dispersion of the wax or other water repellant substance should be in as finely divided a state as possible in order to facilitate the coating of the minute particles of the wax or the like with the said substance. I have found that if the dispersion medium, instead of being a preformed material such as finely divided clay, is produced by precipitation during the process of emulsification or dispersion, then a much greater degree of fineness may be produced with corresponding improvement in the final product.

Such a precipitate may be formed from a variety of salts or combination of salts by reaction therewith of suitable re-agents; preferably two groups of water soluble salts are used adapted to re-act to form a finely divided insoluble precipitate and the emulsifying or dispersion with the wax is caused to take place while the whole mass is in rapid motion.

The invention is applicable to a variety of water repellent substances which may be selected according to the use to which they are to be applied. Such water repellent substance may, for an instance, be an animal, mineral or vegetable wax, rosin, pitch, tar, asphalt or any suitable combination of these.

As a means for producing the finely divided precipitate I have found the combination of two selected salts from two groups of salts to be the most convenient means. One group may be salts such as magnesium chloride, magnesium sulphite, aluminum sulphite, calcium chloride or other members of the same chemical group, and the other group may be salts such as sodium hydroxide, calcium hydroxide, ammonia, etc., the members of the one group being selected in such a way that they will form, with the other group, a finely divided precipitate.

In practicing the method, the wax or other water repellent material is melted, and mixed with water containing in solution a salt or salts of one group. A salt or salts of the other group is then added and the mixture stirred while the precipitate is being formed, the temperature being above the melting point of the wax or water repellent substance whereby the precipitate will form a coating about the particles of wax or other water repellent substance to maintain them in discrete form, and prevent them from fusing when the mixture cools.

The following will serve as an example of one way of practically carrying out the process: 150 pounds of Montan wax are melted; into this is poured 100 pounds of water containing in solution 40 pounds of magnesium chloride, the solution of the magnesium chloride having a temperature of about 10° above the melting point of Montan wax; the melted Montan wax and solution of magnesium chloride is then rapidly stirred and a solution of 5 pounds of sodium carbonate dissolved in 5 pounds of water is added, whereby a finely divide precipitate of magnesium carbonate is formed which coats the particles of Montan wax and maintains them in discrete form, preventing them from fusing together when the mixture cools.

I prefer to add the wax emulsion in such proportions that the wax in the paper will be in excess of 2% by weight of the paper and the inert mineral filler will be in excess of 3% by weight of the paper. The usual sizing material such as rosin size may or may not be added, as desired. It will be found that the use of the filler enables substantially increased quantities of water repellant substance to be retained by the paper, thereby increasing the waterproofing effect.

As many changes could be made in the above process, and many apparently widely different embodiments of my invention, within the scope of the claims, constructed without departing from the spirit or scope thereof, it is intended that all matter contained in the accompanying specification shall be interpreted as illustrative and not in a limiting sense.

What I claim as my invention is:

1. As a new article of manufacture, a paper containing a wax retaining filler and a proportion of wax in excess of that which in the absence of said filler will incorporate with the paper.

2. A method of incorporating wax in paper which consists in mixing with the fibre before its final formation into a paper web, a wax-retaining filler and a proportion of wax in excess of that which in the absence of said filler will incorporate with the fibre.

3. As a new article of manufacture, a paper containing a wax retaining filler and a proportion of wax in excess of that which in the absence of said filler will incorporate with the paper, said filler and wax being deposited from an emulsion containing said wax retaining filler precipitated in situ upon the emulsified wax particles.

4. A method of incorporating wax into paper which consists in mixing with the fiber before its final formation into the paper web, an emulsion containing a wax retaining filler and a proportion of wax in excess of that which in the absence of said filler will incorporate with the fiber, the emulsion containing said wax retaining filler precipitated in situ upon the emulsified wax particles.

5. As a new article of manufacture, a paper containing a wax-retaining filler selected from a group consisting of talc and a colloidal clay, and a proportion of wax in excess of that which in the absence of said filler will incorporate with the paper.

6. A method of incorporating wax into paper which consists in mixing with the fiber before its final formation into a paper web, a wax-retaining filler selected from a group consisting of talc and a colloidal clay, and a proportion of wax in excess of that which in the absence of said filler will incorporate with the fiber.

7. As a new article of manufacture, a paper containing a wax-retaining inert mineral filler, and a proportion of wax in excess of that which in the absence of said filler will incorporate with the paper.

8. A method of incorporating wax into paper which consists in mixing with the fiber before its final formation into a paper web a wax-retaining inert mineral filler, and a proportion of wax in excess of that which in the absence of said filler will incorporate with the fiber.

9. As a new article of manufacture, a paper containing a wax retaining filler and a proportion of wax in excess of that which in the absence of said filler will incorporate with the paper, said filler and wax being deposited from an emulsion containing said wax retaining filler precipitated in situ upon the emulsified wax particles, prior to the incorporation of the emulsion with the paper pulp.

10. A method of incorporating wax into paper which consists in mixing with the fiber before its final formation into the paper web, an emulsion containing a wax-retaining filler and a proportion of wax in excess of that which in the absence of said filler will incorporate with the fiber, the emulsion containing said wax retaining filler precipitated in situ upon the emulsified wax particles, prior to the incorporation of the emulsion with the paper pulp.

In witness whereof I have hereunto set my hand.

GEORGE JAMES MANSON.